Dec. 1, 1959     D. S. FRIDGE, SR     2,914,852
COTTON ROLL HOLDER

Filed Nov. 4, 1957     2 Sheets-Sheet 1

David S. Fridge, Sr.
INVENTOR.

Dec. 1, 1959  D. S. FRIDGE, SR  2,914,852
COTTON ROLL HOLDER
Filed Nov. 4, 1957  2 Sheets-Sheet 2
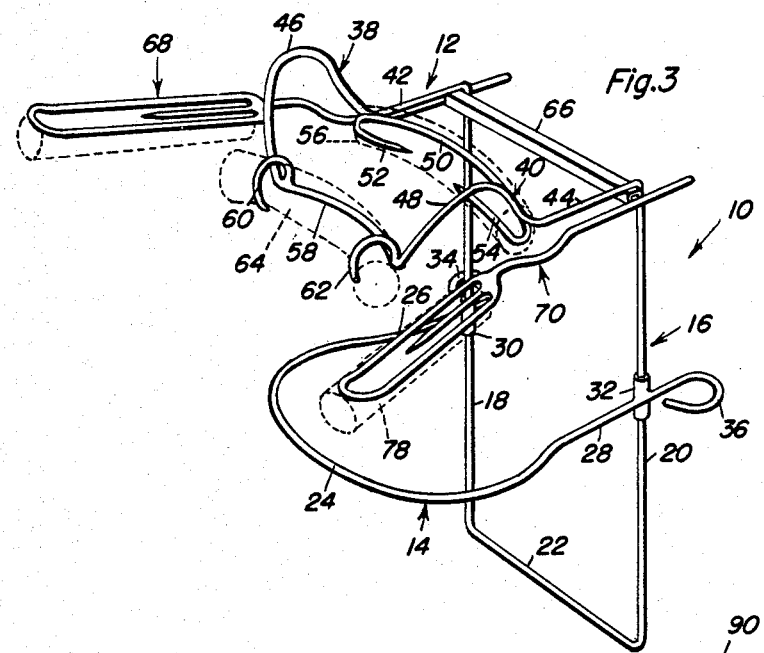
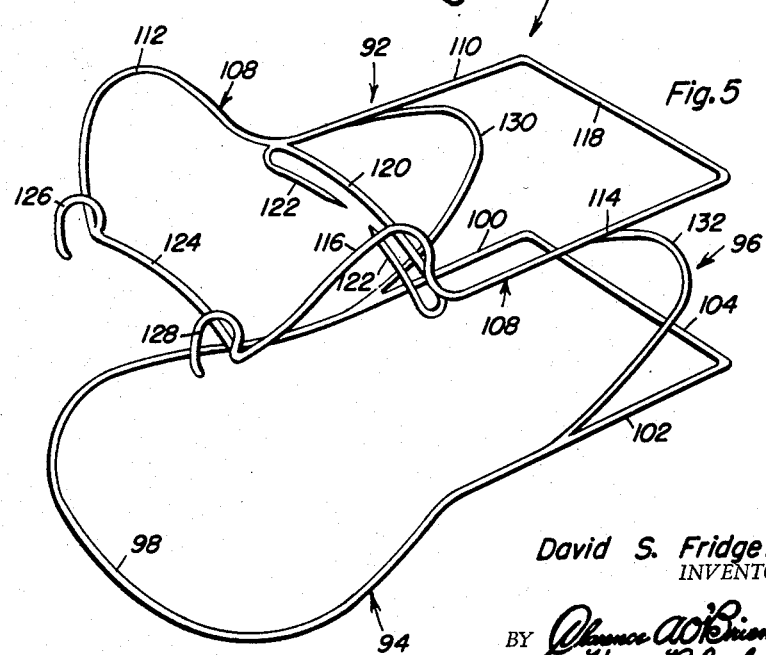
David S. Fridge, Sr.
INVENTOR.

United States Patent Office 2,914,852
Patented Dec. 1, 1959

2,914,852

COTTON ROLL HOLDER

David S. Fridge, Sr., Mobile, Ala.

Application November 4, 1957, Serial No. 694,434

9 Claims. (Cl. 32—35)

This invention relates in general to new and useful improvements in dental instruments, and more specifically to a lower anterior cotton roll holder.

Heretofore dentists, in filling lower anterior teeth, have had to use their fingers to hold cotton rolls in place, and the tongue and lower lip out of the way in order to keep the area dry during the filling operation and while filling sets.

In view of the fact that dryness is necessary during a tooth filling operation, the primary object of this invention is to provide a dental instrument which will keep the lower anterior teeth dry during the filling operation and at the same time permits the dentist's hands to be free at all times so that they may be used for other purposes during the filling operation.

Another object of this invention is to provide an improved dental instrument for isolating lower anterior teeth during a filling operation, the dental instrument being so constructed whereby it holds in place a labial cotton roll and a lingual cotton roll so as to oscillate the lower anterior teeth and at the same time to keep the lower lip and tongue out of the way of the dentist.

Still another object of this invention is to provide an improved dental instrument for isolating lower anterior teeth during the filling operation, the dental instrument being strong and light and at the same time small so that it is not in the way of the dentist during the filling operation.

A further object of this invention is to provide a dental instrument in the form of a lower anterior cotton roll holder, the dental instrument also being provided with cotton roll holders which will support buccal cotton rolls.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 3 is a perspective view of the dental instrument removed from the patient's mouth and the cotton rolls normally carried thereby shown in dotted lines;

Figure 5 is a perspective view of a modified form of dental instrument.

Figure 1:
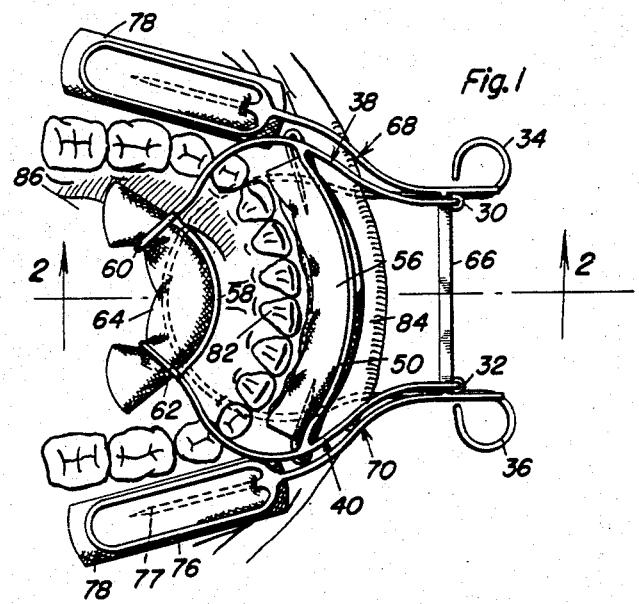
Figure 1 is a fragmentary horizontal sectional view through a patient's mouth and shows in place a preferred form of the present invention and illustrates the relationship of the various cotton rolls held by the lower anterior cotton roll holder with respect to the lower teeth.

Referring now to the drawings in detail, it will be seen that there is best illustrated in Figure 3 the preferred form of lower anterior cotton roll holder which is referred to in general by the reference numeral 10. The lower anterior cotton roll holder 10 includes an upper cotton roll supporting portion 12, a lower chin clamping portion 14 and an intermediate connecting portion 16.

The intermediate connecting portion 16 includes a pair of upright members 18 and 20 which are connected together by a lower cross bar 22.

The chin clamping portion 14 includes a generally semi-circular chin engaging part 24 and a pair of arms 26 and 28. The arms 26 and 28 have secured to end portions thereof sleeves 30 and 32, respectively, which are slidably and frictionally engaged on the upright members 18 and 20, respectively. The arms 26 and 28 terminate in forwardly directed finger engaging portions 34 and 36 through which pressure may be applied to release the sleeves 30 and 32 from the upright members 18 and 20, respectively, to permit vertical movement of the chin clamping portion 14 with respect to the intermediate connecting portion 16.

The upper cotton roll supporting portion 12 includes a pair of spaced arms 38 and 40. The arms 38 and 40 are identical and form rearward extensions of the upper ends of the upright members 18 and 20, respectively. The arms 38 and 40 include forward horizontal portions 42 and 44, respectively, and upwardly bowed rearward portions 46 and 48, respectively.

Extending between the arms 38 and 40 is a transverse cross bar 50. One end of the cross bar 50 is secured to the arm 38 at the intersection of the portions 42 and 46 and the other end of the cross bar 50 is secured to the arm 40 at the intersection of the portions 44 and 48. The cross bar 50 terminates in reversely bent opposed skewers 52 and 54 on which a labial roll 56 is removably mounted.

The rear ends of the portions 46 and 48 are connected by a transversely extending cross bar 58. Secured to the cross bar 58 adjacent its intersection with the portion 46 is a rearwardly extending generally C-shaped roll holder 60. A similar roll holder 62 is secured to the bar 58 adjacent its intersection with the portion 48. Actually, the roll holders 60 and 62 may be extensions of the arms 38 and 40, respectively. Received in the roll holders 60 and 62 is a removable lingual cotton roll 64.

The foregoing is a description of a basic form of the dental instrument which is the subject of this invention. While this basic form may be used, it is desirable in many instances that there also be provided means for supporting buccal cotton rolls. Accordingly, the forward parts of the portions 44 and 42 are connected together by a transverse tubular member 66 which is of a non-circular cross-section. The bar 66 forms sockets at opposite ends thereof. Removably carried by the bar 66 are buccal cotton roll supports 68 and 70. Inasmuch as the cotton roll supports 68 and 70 are identical, only the cotton roll support 70 will be set forth in more detail hereinafter.

Figure 4:
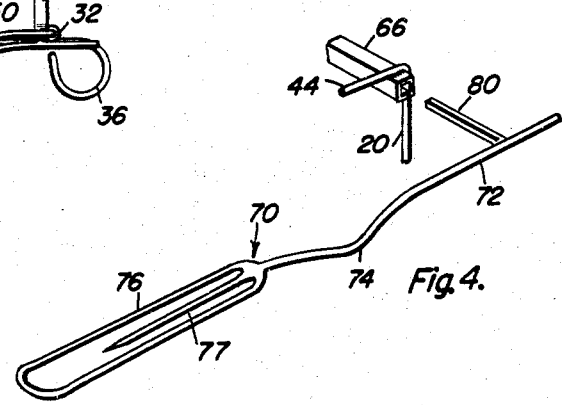
Figure 4 is an enlarged fragmentary perspective view showing the manner in which the buccal cotton roll supports are removably mounted.

Referring now to Figure 4 in particular, it will be seen that there is illustrated the details of the buccal cotton roll support 70. The buccal cotton roll support 70 includes a straight forward portion 72 and an outwardly bowed intermediate portion 74. The intermediate portion 74 terminates in an elongated horizontal loop 76 which is adapted to overlie and position a buccal cotton roll, such as the cotton roll 78 illustrated in Figure 3. Disposed within the general confines of the loop 76 and extending rearwardly from the intersection of the loop 76 with the intermediate portion 74 is a skewer 77. The skewer 77 removably receives a buccal cotton roll 78.

In order that the buccal cotton roll support 70 may be removably carried by the main part of the lower anterior cotton roll holder 10, there is secured to the forward portion 72 a mounting member 80. The mounting member 80 is of a cross section substantially identical with the interior cross-section of the member 66 and has a sliding telescoping fit therewith.

Figure 2:
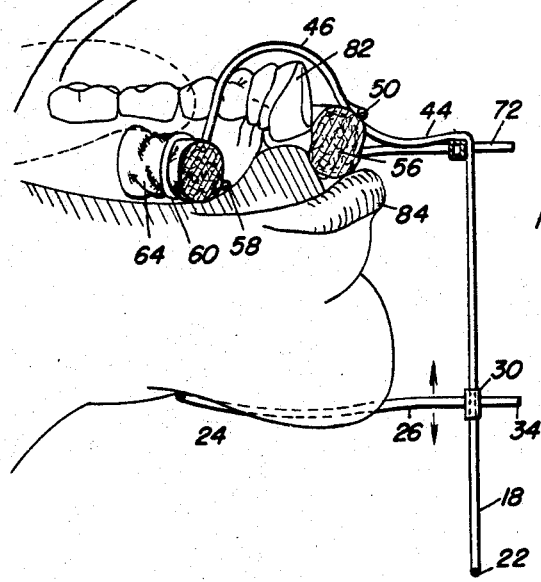
Figure 2 is an enlarged fragmentary sectional view taken substantially upon the plane indicated by the section line 2—2 of Figure 1 and shows further the relationship of the labial cotton roll and the lingual cotton roll with respect to the lower anterior teeth.

Referring now to Figures 1 and 2 in particular, it will be seen that when the lower anterior cotton roll holder 10 is in place relative to a patient's mouth, the labial cotton roll 56 is disposed intermediate the lower anterior teeth 82 and the lower lip 84 thus holding the lower lip 84 in an out of the way position and isolating the front part of the lower anterior teeth 82.

The lingual cotton roll 64 is disposed rearwardly of the lower anterior teeth 82 and in a position overlying the tongue 86 so as to depress the tongue and isolate the rear of the lower anterior teeth 82.

The buccal cotton roll supports 68 and 70 extend into the patient's mouth and support the buccal cotton rolls 78 in position intermediate the lower teeth and the cheeks of the patient. Thus it will be seen that the cotton rolls 56, 64 and 78 completely isolate the lower anterior and posterior teeth and maintain them in a dry state so that the lower anterior teeth 82 are retained in the proper condition for a dental filling operation.

The lower anterior cotton roll holder is positioned by first placing the upper cotton supporting portion in the patient's mouth in the desired position and then by moving the chin clamping portion 14 upwardly into engagement with the patient's chin. The lower anterior cotton roll holder 10 is removed by applying pressure to the finger engaging portions 34 and 36 and moving the chin clamping portion 14 downwardly.

Referring now to Figure 5 in particular, it will be seen that there is illustrated a modified form of lower anterior cotton roll holder which is referred to in general by the reference numeral 90. The lower anterior cotton roll holder 90 includes an upper cotton roll supporting portion 92, a lower chin clamping portion 94 and an intermediate portion 96.

The lower chin clamping portion 94 includes a generally semi-circular rearwardly disposed chin engaging part 98 which terminates in forwardly extending arms 100 and 102. The forward ends of the arms 100 and 102 are connected together by a cross bar 104.

The upper cotton roll supporting portion 92 includes a pair of spaced arms 106 and 108. The arm 106 includes a straight forward portion 110 and upwardly bowed rear portion 112. The arm 108 includes a forward straight portion 114 and an upwardly bowed rear portion 116. The forward ends of the forward portions 110 and 114 are connected together by a transverse bar 118. The arms 106 and 108 are connected together by a transverse member 120 which is connected to the arm 106 at the intersection of the portions 110 and 112 and to the arm 108 at the intersection of the portions 114 and 116. The member 120 terminates in reversely bowed opposed skewers 122. The skewers 122 will hold a cotton roll, such as the cotton roll 56.

The rear ends of the portions 12 and 16 are connected together by a rear transverse member 124. The portions 112 and 116 include rearwardly disposed extensions in the form of C-shaped cotton roll holders 126 and 128, respectively, which receive a cotton roll, such as the cotton roll 64.

The intermediate connecting portion 96 is in the form of a pair of C-shaped spring clips 130 and 132. The spring clip 130 extends between and is secured to the arms 106 and 100. The spring clip 132 extends between and is secured to the arms 108 and 102. It is to be understood that the spring clips 130 and 132 normally retain the chin clamping portion 94 in a chin clamping position by squeezing the bars 118 and 104 together, the chin clamping portion 94 is moved away from the upper cotton roll support 92 and thus the lower anterior cotton roll holder 90 may be removed from the patient's mouth. It is to be understood that the lower anterior cotton roll 90 will function in the same manner as the lower anterior cotton roll holder 10 with the exception of the fact that no provisions are made for the supporting of the buccal cotton roll 78. If desired, however, this may also be mounted on the lower anterior cotton roll holder 90.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A dental instrument for isolating lower anterior teeth, said dental instrument comprising an upper cotton roll supporting portion, a lower chin clamping portion, and an intermediate connecting portion, said upper cotton roll supporting portion including cotton roll supports for a labial cotton roll and a lingual cotton roll, said cotton roll support for said labial cotton roll including a pair of opposed skewers.

2. A dental instrument for isolating lower anterior teeth, said dental instrument comprising an upper cotton roll supporting portion, a lower chin clamping portion, and an intermediate connecting portion, said upper cotton roll supporting portion including cotton roll supports for a labial cotton roll and a lingual cotton roll, said cotton roll support for said labial cotton roll including a pair of opposed skewers, said cotton roll support for said lingual cotton roll including a pair of transversely spaced C-shaped members for receiving end portions of a lingual cotton roll.

3. A dental instrument for isolating lower anterior teeth, said dental instrument comprising an upper cotton roll supporting portion, a lower chin clamping portion including a semi-circular rearwardly disposed chin engaging part, and an intermediate connecting portion, said upper cotton roll supporting portion including cotton roll supports for a labial cotton roll and a lingual cotton roll, said intermediate connecting portion being in the form of a pair of opposed spaced parallel C-shaped spring clips having opposite ends secured to said upper portion and to said lower portion and resiliently resisting the separation of said upper portion and said lower portion.

4. A dental instrument for isolating lower anterior teeth, said dental instrument comprising an upper cotton roll supporting portion, a lower chin clamping portion, and an intermediate connecting portion, said upper cotton roll supporting portion including cotton roll supports for a labial cotton roll and a lingual cotton roll, said cotton roll support for said labial cotton roll including a pair of opposed skewers, said cotton roll support for said lingual cotton roll including a pair of transversely spaced C-shaped members for receiving end portions of a lingual cotton roll, said intermediate connecting portion being in the form of a C-shaped spring clip.

5. A dental instrument for isolating lower anterior teeth, said dental instrument comprising an upper cotton roll supporting portion, a lower chin clamping portion, and an intermediate connecting portion, said upper cotton roll supporting portion including cotton roll supports for a labial cotton roll and a lingual cotton roll, sockets disposed at opposite sides of said upper cotton roll supporting portion, removable buccal cotton roll supports having mounting portions seated in said sockets.

6. A dental instrument for isolating lower anterior teeth, said dental instrument comprising an upper cotton roll supporting portion, a lower chin clamping portion, and an intermediate connecting portion, said upper cotton roll supporting portion including cotton roll supports for a labial cotton roll and a lingual cotton roll, said cotton roll support for said labial cotton roll including a pair of opposed skewers, said cotton roll support for said lingual cotton roll including a pair of transversely spaced C-shaped members for receiving end portions of a lingual cotton roll, sockets disposed at opposite sides of said upper cotton roll supporting portion, removable buccal cotton roll supports having mounting portions seated in said sockets.

7. A dental instrument for isolating lower anterior teeth comprising an upper cotton roll supporting portion embodying means adapted to removably support a labial cotton roll and additional means spaced therefrom and adapted to support a lingual cotton roll, said last named means including a pair of spaced opposed and aligned downwardly opening C-shaped members for reception of end portions of the lingual cotton roll, said members being connected by an intervening horizontal transversely extending crossbar constituting a reinforcing member and being of prerequisite curvature, the means for supporting the labial cotton roll embodying a crossbar terminating at its ends in return bent portions pointed and aligned and providing skewers on which the labial roll is removably mounted, a lower chin clamping portion underlying said upper cotton roll supporting portion, and an intervening and connecting portion for the upper cotton roll supporting portion and chin clamping portion.

8. The structure defined in claim 8 and wherein said intervening connecting portion embodies a pair of upright members connected together at their lower ends by a crossbar and connected together at their upper ends by a tubular member the ends of which are open and provide sockets.

9. The structure defined in claim 8 and readily attachable and detachable buccal cotton roll supports having mounting portions at attachable outwardly disposed ends seated in said sockets.

References Cited in the file of this patent

UNITED STATES PATENTS

| | | |
|---|---|---|
| 1,010,146 | Ivory | Nov. 28, 1911 |
| 1,742,080 | Jones | Dec. 31, 1929 |
| 2,625,739 | Garmers | Jan. 20, 1953 |
| 2,644,234 | Scott | July 7, 1953 |